Jan. 27, 1925.
W. SCHAAKE
TROLLEY POLE HEAD
Filed May 19, 1922
1,524,579
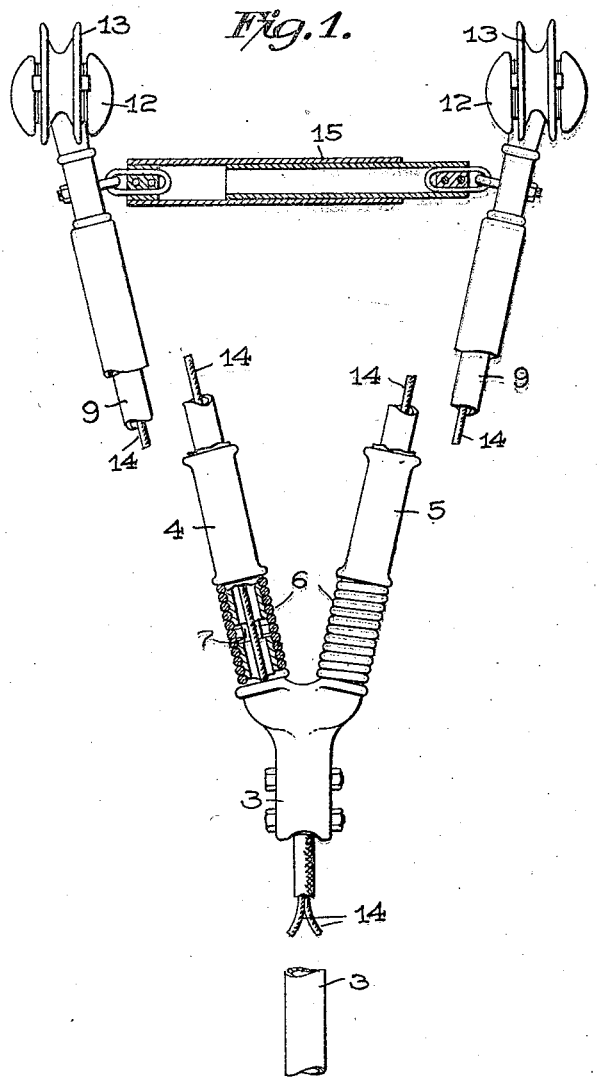
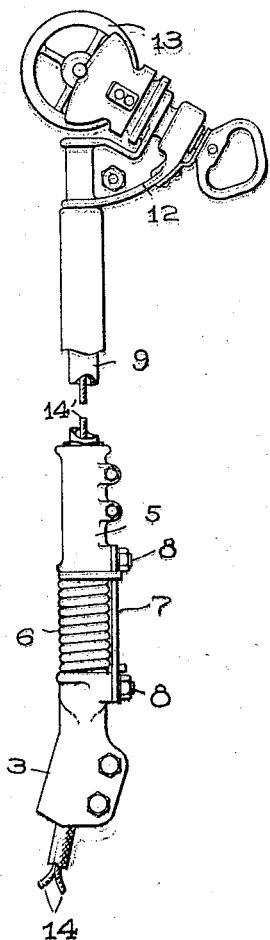
WITNESSES:
INVENTOR
William Schaake
BY
ATTORNEY

Patented Jan. 27, 1925.

1,524,579

UNITED STATES PATENT OFFICE.

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA.

TROLLEY-POLE HEAD.

Application filed May 19, 1922. Serial No. 562,075.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Trolley-Pole Heads, of which the following is a specification.

My invention relates to current collectors and particularly to means for mounting a plurality of contact devices upon a single supporting member.

My invention is designed especially for employment in connection with trolley busses, or trackless trolley vehicles, wherein contact members or current collectors are employed to co-operate with a pair of trolley wires. When such collectors are mounted upon a single pole, provision must be made to permit the vehicle to turn out from its normal path of movement, while, at the same time, retaining the current collectors in engagement with their respective trolley wires.

The object of my invention is to provide an improved and simplified form of multiple-contact structure whereby engagement between the contact members and the trolley wires may be effectively maintained, notwithstanding deviations in the path traveled by the vehicle upon which the contact members are mounted.

Still another object of my invention is the provision of means for preventing the entanglement of the current collectors with the overhead wire structure, and means for preventing the supporting members for the collectors from becoming so entangled with the trolley wires as to cause short circuits.

As shown in the accompanying drawing, Figure 1 is a view, partially in front elevation and partially in section, of a portion of a trolley pole embodying my invention, and Fig. 2 is a view thereof in side elevation.

A trolley pole 3, only a portion of which is shown, is mounted upon the roof of a vehicle and normally biased upwardly, in the usual manner. The pole 3 is provided with two diverging arms 4 and 5 that are supported therefrom by helical springs 6. Stiffening plates 7 of yielding material are slidably supported by bolts 8 and serve to resist excessive downward movement of the arms 4 and 5, but do not greatly interfere with a limited amount of flexing of the springs 6 in any direction.

The arms 4 and 5 are provided with intermediate tubular sections 9 consisting of suitable insulating material. Swivel harps 12 are mounted upon the upper ends of the arms 4 and 5 and carry trolley wheels 13 that have electrical connection with a pair of conductors 14 which lead to apparatus within the vehicles.

Each of the trolley harps 12 supports one end of a barrier 15 which consists of two telescopic members of suitable insulating material. The arms 4 and 5 are freely movable, within certain limits, about their supporting springs to permit the wheels 13 to readily adjust themselves to irregularities in the spacing of the trolley wires (not shown) with which they co-operate and to adjust themselves to varying distances in the height of such wires above the vehicle.

The arm 15 serves as a guard, or barrier, to prevent the trolley wires from becoming short circuited through being caught between the arms 4 and 5 in case the trolley wheels 13 become disconnected from the wires. The barrier 15 is of telescopic construction in order that relative movement of the arms 4 and 5 may not be impeded thereby.

The head of the pole 3, being of a general V-shape and the sides of the harps 12, at their upper portions, being provided with rounded surfaces, it will be apparent that there is little danger of the trolley wires becoming entangled with the pole-head construction and the current collectors.

Various modifications in detail and general arrangement may be made without departing from the spirit and scope of the invention, as defined in the accompanying claims.

I claim as my invention:

1. The combination with a trolley pole, of a pair of diverging contact-carrying arms supported thereby, and a telescopic barrier supported between the outer ends of the said arms.

2. The combination with a trolley pole, of a pair of helical springs supported thereby, a pair of diverging collector-supporting arms carried by the springs, and an extensible barrier interposed between the outer ends of the said arms.

3. The combination with a trolley pole, of a pair of diverging relatively movable arms yieldingly supported thereby, and a barrier supported between the outer ends of said arms.

4. The combination with a trolley pole, of a pair of diverging helical springs, each of which has one end supported by the trolley pole, and a contact-carrying arm supported by the outer end of each of said springs, and a pair of telescopic barrier members supported by the outer ends of the said arms.

5. The combination with a trolley pole, of a pair of diverging helical springs each of which has one end supported by the trolley pole, a contact-carrying arm supported by the outer end of each of said springs, and an extensible barrier supported by the outer ends of the said arms.

6. The combination with a trolley pole, of a pair of diverging helical springs, each of which has one end supported by the trolley pole, a contact carrying arm supported by the outer end of each of said springs, and a pair of telescopic barrier members supported by the outer end of the said arms, the said barrier having pivotal connection at its respective ends to the said arms.

7. The combination with a trolley pole, of a pair of relatively movable collector-supporting arms carried thereby and a telescopic barrier interposed between and supported by the said arms.

8. The combination with a trolley pole, of a pair of collector-supporting arms carried thereby, a yielding member interposed between one of the arms and the pole, and an extensible barrier secured to the outer ends of the arms.

9. The combination with a trolley pole, of two collector-supporting arms carried by the pole, one of which is movable with relation to the pole, and a telescopic barrier secured to the outer ends of the arms.

In testimony whereof, I have hereunto subscribed my name this 9th day of May 1922.

WILLIAM SCHAAKE.